(12) United States Patent
Huber et al.

(10) Patent No.: US 6,422,127 B1
(45) Date of Patent: Jul. 23, 2002

(54) HYDRAULIC ACTUATION ARRANGEMENT

(75) Inventors: Gerhard Huber, Frankenhofen; Bernhard Hollerbach, Steingaden/Urspring, both of (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/714,638

(22) Filed: Nov. 17, 2000

(30) Foreign Application Priority Data

Nov. 22, 1999 (AU) .......................................... A 1983/99

(51) Int. Cl.$^7$ ................................................. F15B 13/04
(52) U.S. Cl. ..................... 91/452; 251/63.4; 137/516.27
(58) Field of Search ...................... 60/476, 488; 91/468, 91/452, 442, 494; 251/63.4, 82; 137/512.2, 512.3, 516.27

(56) References Cited

U.S. PATENT DOCUMENTS 3,027,913 A * 4/1962 Chatham et al. ....... 137/516.27
6,217,105 B1 * 4/2001 Hollerbach ................. 296/136

FOREIGN PATENT DOCUMENTS

DE          0893605 A1 *  1/1999

* cited by examiner

*Primary Examiner*—Edward K. Look
*Assistant Examiner*—Thomas E. Lazo
(74) *Attorney, Agent, or Firm*—Dykema Gossett PLLC

(57) ABSTRACT

A hydraulic actuation arrangement including a double-action working cylinder whose working chambers are in communication via a mutually unseatable check valve with one side of a reversible pressure medium source, respectively, whereby each working chamber is connected to a pressure medium reservoir by a pressure-relief valve or pressurizing valve, and at least one working chamber is furthermore connected to the pressure medium reservoir via an additional pressurizing valve. When an additional pressurizing valve is provided with two different pressure threshold values, the manual force used in emergency operation is therefore clearly reduced after introduction of the manual movement whereby these force levels for both movement directions may be selected independently from the maximum system pressure. A two-stage pressurizing valve includes a flow-through opening in the passage that may be blocked by the valve element whereby the surface of the flow-through opening is smaller than the cross section surface of the valve element.

7 Claims, 1 Drawing Sheet

HYDRAULIC ACTUATION ARRANGEMENT

BACKGROUND OF THE INVENTION

1. Field of the Invention

The invention relates to a hydraulic actuation arrangement, particularly for covers, doors, convertible tops and the like on vehicles, having at least one double-action working cylinder whose working chambers are in communication via a mutually unseatable check valve with one side of a reversible pressure medium source, respectively, whereby each working chamber is connected to a pressure medium source by at least one pressure-relief valve or pressurizing valve, and whereby at least one working chamber communicates additionally with a pressure medium reservoir through an additional pressurizing valve and a two-stage pressurizing valve. This configuration is especially used in an actuation arrangement to open and close a flow-through opening in a passage for the pressure medium, having a valve housing and a valve element slidably mounted therein, whereby the valve element is biased by a resilient element in the closing direction of the flow-through opening, and whereby on the resilient element there is a control connection provided through which the valve element is biased by a force in the closing direction as well.

2. The Prior Art

Arrangements of this type are well known and make possible, for example, automatic actuation of vehicle doors, hoods, maintenance access doors, trunk lids, or the cover of the space receiving a convertible top. It is guaranteed by the use of mutually unseatable check valves, which are for example described for pneumatic actuation devices in DE 43 34 843 A1, that during turn-off or malfunction of the operational pressure, the hinged covers remain hydraulically blocked in a particular position to prevent uncontrolled movement (of the component) and risk of injuries resulting thereof. The pressurizing valve enables controlled continued movement of the hinged cover by hand in this condition, for example, to thusly allow emergency closing against the force determined by the pressurizing valve. In AT 405 752 B1 there is also a similar configuration described in which however no precautions of any kind are offered to make available different force levels during the manual actuation process.

To achieve a reduction in the force necessary to move the component by hand in an emergency operation, which is otherwise actuated hydraulically, it has been proposed in DE 197 40 029 C2 to provide a pressure-relief valve with two different operational triggers so that after overcoming a first higher threshold value at the beginning of the emergency operation, a lower pressure is subsequently necessary to keep the valve open and to manually bring the component into the desired position. Nevertheless, in this arrangement the valve element is continuously biased by the existing operating pressure in the opening direction and the first pressure threshold value must correspond to the maximal possible or desired system pressure, which leads to very high initial forces to overcome during emergency operation. Moreover, the two-stage pressurizing valve disclosed in DE 197 40 029 C2 is to be provided with a cylindrical stepped sealing element so that a considerably longer passage is necessary to the opening of the first higher pressure stage, which in turn makes necessary a longer influence of the higher force at the beginning of the manual actuation.

Two-stage valves are also very generally disclosed in DE 41 30 832 C1, wherein the two stages are however not disposed one behind the other and in the same flowthrough passage. In U.S. Pat. No. 5,916,628 a check valve is disclosed but no information is given about the force conditions before and after pressurizing by the valve, since only the flow-through cross section is of significance during the process of the opening movement. The safety check valve in U.S. Pat. No. 3,916,946 includes two independently functioning valve elements that are connected in series, but there is no information concerning a controlled movement sequence or different pressure stages.

It is therefore the object of the present invention to provide an improved arrangement of the type described above wherein the manual force necessary during emergency operation may be clearly reduced at the start of the manual movement as well as during the movement, whereby these force levels may be selected for both movement directions independently from the maximum system pressure and the force levels may also be selected independently in consecutive sequence. However, an additional object of the present invention is also a two-stage pressurizing valve which safely guarantees by simple fabrication the keeping of both pressure threshold values and which makes the transfer between the two switching stages possible in a rapid manner.

SUMMARY OF THE INVENTION

The first object is achieved according to the invention in that the hydraulic actuation arrangement described above is provided with at least one additional pressurizing valve and at least two different threshold values. The forces for emergency operation are given by the pressure threshold values of the second pressurizing valve, whereby the higher value may correspond to the highest system pressure at the most, but which is preferably considerably lower. The higher pressure threshold value is preferably selected in a way whereby the normally hydraulic actuated component is safely fixed exactly in each position—its own position and that of the vehicle—and whereby a force exceeding the holding force only by a small degree is sufficient for displacement from this position. After introduction of the manual movement there is only a force necessary to continue the movement, which is given by the second lower pressure threshold value of the second pressurized valve. This advantageous force reduction may be in the most simple application be provided only for one movement direction, but it may also be achieved of course for both movement directions of the normally hydraulic actuated component in that both working chambers are respectively connected to the pressure reservoir via at least one common pressurizing valve, preferably via a respective dedicated (own) pressurizing valve.

The pressure threshold value for opening of the additional pressurizing valve is thereby preferably higher than the pressure threshold value to keep the valve in an open position.

Each working chamber is connected with the pressure means reservoir through its own pressurizing valve according to the invention to achieve, independently from one another, an adjustment of the actuation forces in the opening and closing direction.

In both above-mentioned cases it is also conceivable that two separate pressure relief valves exist for the maximum system pressure, one for the outward movement of the working cylinder and one for the inward movement. Thereby the pressure threshold values are then set maximally as high for the respective second pressurized valve as the threshold values of the pressure relief valve connected on that side of the working cylinder.

In working cylinders with a different cross section at the piston-side or rod-side it is preferably proposed that in order to obtain volume compensation, the piston-side working chamber of the working cylinder is connected with the pressure medium reservoir via a line having a check valve blocking toward that pressure medium reservoir.

The second object of the present invention is achieved by a pressurizing valve which is characterized in that there is a flow-through opening provided that may be blocked by the valve element whereby the surface area of the flow-through opening is smaller that the cross section area of the valve element, and whereby the front end of the valve element controlling the flow-through opening is designed in a cone-shaped manner. Through the cooperation of the valve seat (defined by the flow-through opening) with the valve cone of the valve element, an optimum sealing effect on the shoulder of the valve seat is obtained to guarantee the transfer between the two pressure threshold values as quickly as possible, which are given by the different pressure applied to the surfaces (entire valve cone—lower pressure threshold value; cross section of the valve seat higher pressure threshold value.)

It is preferred that the front end of the valve element sealingly cooperates with the shoulder of the flow-through opening metal-to-metal and whereby the valve element, and preferably the second flow-through opening, are sealingly guided in the valve housing metal-to-metal as well.

According to an additional characteristic of the invention, a piston is provided for hydraulic blocking of the pressurized valve whereby the piston is urged toward the end of the valve element, which is disposed at the opposite end of the shoulder of the flowthrough opening, by means of pressure applied at the control connection.

The invention will now be described in more detail with reference to accompanying drawings.

DETAILED DESCRIPTION OF THE PREFERRED EMBODIMENTS

Figure 1:
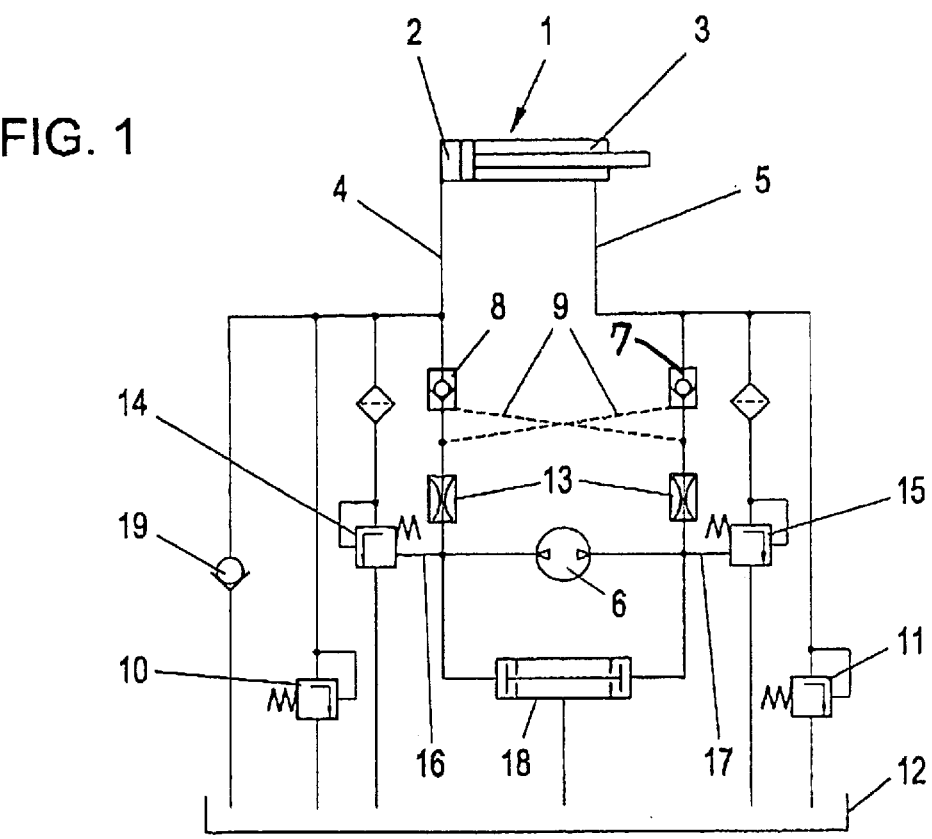
FIG. 1 shows thereby a schematic, hydraulic circuit of an arrangement according to the invention.

The arrangement illustrated in FIG. 1 for hydraulic actuation of a hinged cover, a trunk lid or an otherwise moveable component on a vehicle is provided with at least one double-action working cylinder 1, which is joined to the vehicle on one side and on the other side to a component to be moved, such as a hinged cover. The two working chambers 2, 3 of the working cylinder 1 are connected via lines 4, 5 with a reversible pressure medium source 6, preferably a reversible pump with an electric drive motor, which communicates via a connection line with the main electric circuit or possibly the control electronics of the vehicle. In place of the directly linked attachment of the working cylinder at both sides, which requires of course correspondingly flexible lines 4, 5 or a hydraulic unit 6 moving together with the working cylinder 1, the linked attachment of the working cylinder 1 at the vehicle side and/or hinged cover could also be a lever or a hinge arrangement whereby the working cylinder 1 could be mounted rigidly in relation to the vehicle as well.

A check valve 7, 8 is respectively provided in each of the lines 4, 5, which are in turn connected with one side of the reversible pressure source 6. The two check valves 7, 8 are thereby connected by the lines 9 and may be unseated through the lines 9. The two working chambers 2, 3 of the working cylinder are depressurized by a respective pressure relief valve 10, 11 and pressure medium is diverted into the pressure means reservoir 12, preferably a hydraulic fluid tank, as soon as a set pressure level has been reached or surpassed on the corresponding side. The pressure relief valves 10, 11 determine the maximum possible pressure at the respective side of the working cylinder 1, and in simplified configurations, only one pressure relief valve for both sides could be provided, which would predetermine one single maximum value for the system pressure. In the connection lines 4, 5, preferably between the hydraulic unit 6 and the check valves 7, 8, there are also nozzles 13 or similar throttle elements installed.

Parallel to the pressure relief valves 10, 11 or toward the lines in which they are disposed, each of the working chambers 2, 3 of the working cylinder is also connected with the pressure means reservoir 12 via a two-stage pressurizing valve 14, 15, respectively. These second pressurizing valves 14, 15 are connected with the reversible pressure medium source 6 via control lines 16, 17 in such a manner that the pressurizing valves 14, 15 are completely blocked hydraulically at least at applied system pressure in front of the check valves 7, 8—so that pressure may build up on the corresponding side up to the set maximum pressure determined by the respective pressure relief valve 10, 11.

Both sides of the reversible pressure medium source 6 are finally also connected with each other via a shuttle valve 18, which is also provided with a connection to the pressure means reservoir 12. Lastly, the piston-side working chamber 2 of the working cylinder 1 is connected with the pressure medium reservoir 12 via a check valve 19 blocking in the direction of the reservoir 12 for the purpose of volume compensation during emergency operation.

In the following, the functioning of the illustrated arrangement is described as shown in FIG. 1. The working cylinder 1 moves in or out during hydraulic opening or closing. The motor of the pump for the pressure medium source 6 is placed under electric power, the pump subsequently runs and supplies pressure medium via check valves 7 or 8 to the piston-side working chamber 2 or the rod-side working chamber 3. The pressurizing valve 14 or 15, which is disposed on the same side as the respective in-flow check valve 7, 8, is hydraulically blocked via the lines 16 or 17. The pressure in the working chamber 2 or 3 may build up to a value at which the pressure relief valves 10 or 11 open up. Thereby varying forces and therefore also varying pressure levels may be required at both sides depending on kinematics and lever ratio. However, the pressure and the thereby produced force are set at a value that is merely sufficient to be able to conduct or to continue the opening or closing movement in the respective stages. Unnecessary and excessive forces are avoided, which would lead to damage or injuries when engaging obstacles. The (fluid) volume of the rod-side working cylinder 3 flows then into the tank 12 through the controlling check valve 7 and the shuttle valve 18 during the outward movement.

During malfunctioning of the reversible pressure medium source 6, as during electric power supply failure, the check valves 7 and 8 block immediately and thus keep the normally hydraulically moved component fixed in its current position. At the same time, the pressure in the control lines 16 and 17 drops also so that the hydraulic block of the second pressurizing valve 14 and 15 is lifted. The two pressurizing valves 14, 15 are then functioning and the force necessary for the now manual operation of the vehicle component is determined by the pressure threshold values of these two pressurizing valves 14, 15. The higher one of the two pressure threshold values serves as holding pressure in case of employment to fix the normally hydraulic actuated component of the vehicle in a particular position, for example, when the vehicle is at an inclined position or is positioned against the force of the wind or the like. Should now manual actuation take place, then the user has to overcome this holding pressure, which may be selected differently at either side of the hydraulic system by separate pressurizing valves 14 and 15, and which leads then to switching of the pressurizing valve to its second lower pressure threshold value so that the necessary force for continued movement of the component is clearly less than the holding force. At release of the force needed to move the component, the pressurizing valve 14, 15 jumps back again to its higher-pressure threshold value and the holding force becomes effective again.

Figure 2:
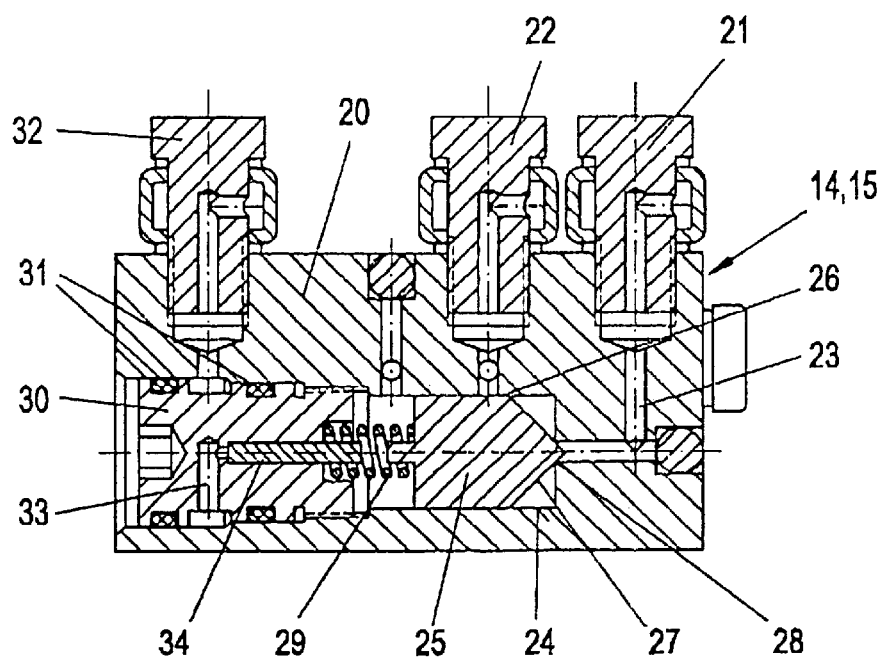
FIG. 2 shows a sectional view through a two-stage pressurized valve according to the invention.

In FIG. 2 there is shown in a sectional view an embodiment, according to the invention, of a two-stage pressurizing valve 14,15, which may advantageously find application in a hydraulic arrangement as described above, but which is not limited to an application of this type.

In a housing 20 there are provided an inlet connection 21 and an outlet connection 22 for the pressure medium between which runs a passage 23 for the pressure medium. A valve element 25, which is slidably mounted in a bore 24, opens and closes in the process of its movement in the bore 24 a first valve seat 26 for the pressure medium. One end of the valve element 25 is thereby designed in the shape of a valve cone 27 and cooperates with a second valve seat 28. The valve seat 28 is flat, preferably with a circular cross section, and it is sealingly locked metal-to-metal with the valve cone 27 in an end position of the valve element 25. Through the difference in the cross section of the second valve seat 28—which is smaller than the cross section of the bore 24 in the housing 20 of the pressurizing valve 14, 15—the two different pressure threshold values are realized since the force to displace the valve element 25 is there of course substantially the same in both cases and which consists only of the counterforce of the resilient element, preferably in the form of a closing spring 29. Through the cone-shaped design of the valve element 25, there is guaranteed a secure seal seat in conjunction with the rapid availability of a best possible flow-through cross section, which means rapid switching is ensured from one pressure threshold value to the second pressure threshold value.

The closing force of the spring 29 may be set by a set screw 30, which may be adjusted in a threaded bore of the housing 20 in the direction of movement of the valve element 25. The set screw 30 is sealingly inserted via a seal 31 whereby the set screw 30 compresses the spring 30 during tightening into the housing and which thereby increases the force of the spring. A control connection 32 is provided in the housing 20 for hydraulic blocking of the pressurizing valve 14, 15 whereby the control connection 32 communicates with a passage 33 in the set screw 30, which controls the function of a working chamber of a hydraulic cylinder. The pressure medium in the passage 33 acts upon a pin-type piston 34, which is slidable in longitudinal direction toward the valve element 25, and which finally applies a force in the closing direction of the valve and on the rear side and thereby totally blocks the valve 14, 15.

During, use of the hydraulic actuation arrangement described above, a control connection 32 on the valve 14, 15 is connected with a control line 16 or 17. At the inlet connection 21 there is a line 4 or 5 connected, starting from the piston-side or rod-side working chamber 2, 3 of the working cylinder, and at the outlet connection 22 there is the line connected that leads into the pressure medium reservoir.

We claim:

1. A two-stage pressurizing valve which comprises:
   a housing which defines a bore; an outlet passage which communicates with said bore at a first seat; an inlet passage which communicates with said bore at a second seat, said second seat having a smaller cross section than said bore; and a control passage for pressure medium,
   a valve element movable in said bore to open and close said first and second seats, said valve element having a first end shaped as a cone which is capable of seating on said second seat to block said inlet passage,
   a bias means for assisting pressure medium from said control passage in moving said valve element such that said cone-shaped first end seats on said second seat and blocks said inlet passage, and
   a piston which is movable against a second end of said valve element to prevent movement thereof away from said second valve seat, said piston being movable by pressure medium from said control passage.

2. A pressurizing valve according to claim 1, wherein said housing is made of metal, wherein said valve element is made of metal, wherein said cone-shaped first end of said valve element seals said second seat metal-on metal, and wherein said valve element is guided in said housing metal-on-metal.

3. A pressurizing valve according to claim 1, wherein said bias means comprises a spring.

4. A pressurizing valve according to claim 1, including a set screw which is movable in said bore, wherein said spring is positioned between said set screw and said valve element, and wherein said set screw defines a passageway therein containing said piston.

5. A hydraulic apparatus for moving an element relative to a vehicle body, said hydraulic apparatus comprising a double-action working cylinder defining first and second working chambers, a reversible pressure medium source, first and second respective lines connecting said pressure medium source with said first and second working chambers, a reservoir for pressure medium, third and fourth lines for respectively connecting said first and second working chambers with said reservoir, first and second valves respectively in said third and fourth lines, and a fifth line connecting one of said first and second working chambers with said reservoir, said fifth line containing a two-stage pressurizing valve according to claim 1.

6. A hydraulic apparatus according to claim 5, including a sixth line connecting a second of said first and second working chambers with said reservoir, said sixth line containing a said two-stage pressurizing valve.

7. A hydraulic apparatus according to claim 5, wherein one of said first and second working chambers is a piston chamber, and including a seventh line connecting said piston chamber with said reservoir, and a check valve in said seventh line blocking pressure medium flow towards said reservoir.

* * * * *